(12) United States Patent
Morris

(10) Patent No.: US 11,628,041 B2
(45) Date of Patent: Apr. 18, 2023

(54) SUBGINGIVAL SAFE END DENTAL BUR

(71) Applicant: Christopher Morris, Brampton (CA)

(72) Inventor: Christopher Morris, Brampton (CA)

(*) Notice: Subject to any disclaimer, the term of this patent is extended or adjusted under 35 U.S.C. 154(b) by 29 days.

(21) Appl. No.: 16/979,516

(22) PCT Filed: Mar. 29, 2019

(86) PCT No.: PCT/CA2019/000087
§ 371 (c)(1),
(2) Date: Sep. 9, 2020

(87) PCT Pub. No.: WO2019/183710
PCT Pub. Date: Oct. 3, 2019

(65) Prior Publication Data
US 2020/0405443 A1    Dec. 31, 2020

Related U.S. Application Data
(60) Provisional application No. 62/761,568, filed on Mar. 30, 2018.

(51) Int. Cl.
*A61C 3/02* (2006.01)

(52) U.S. Cl.
CPC ...................... *A61C 3/02* (2013.01)

(58) Field of Classification Search
CPC .... A61C 3/02; A61C 3/12; A61C 3/00; A61C 3/03; A61C 3/06; A61B 2017/320008
See application file for complete search history.

(56) References Cited

U.S. PATENT DOCUMENTS

| | | | | |
|---|---|---|---|---|
| 749,624 A | * | 1/1904 | McCullough | A61C 3/02 433/165 |
| 2,569,844 A | * | 10/1951 | Berliner | A61B 17/32093 433/144 |
| 4,571,184 A | * | 2/1986 | Edwardson | B24D 99/00 D8/90 |
| 4,895,515 A | * | 1/1990 | Axelsson | A61C 17/00 433/166 |
| 2002/0037490 A1 | | 3/2002 | Yuuki et al. | |
| 2002/0182565 A1 | * | 12/2002 | Senia | A61C 5/42 433/102 |
| 2004/0081940 A1 | * | 4/2004 | Roetzer | A61C 3/02 433/165 |
| 2004/0191725 A1 | * | 9/2004 | Szymaitis | A61C 3/02 433/165 |
| 2018/0085190 A1 | * | 3/2018 | Hyun | A61C 9/0033 |

FOREIGN PATENT DOCUMENTS

DE  20211248 U1 * 9/2002 ............. A61C 3/02
WO  2019183710 A2   10/2019

* cited by examiner

*Primary Examiner* — Heidi M Eide
(74) *Attorney, Agent, or Firm* — Rahman LLC

(57) ABSTRACT

A new dental bur with specific dimensions that enable the bur to be used for cutting and trimming filling material under the gum tissues and between teeth. The bur includes a safe end. The bur also includes an angled flat cutting surface and an angled flat surface of the safe end.

2 Claims, 3 Drawing Sheets

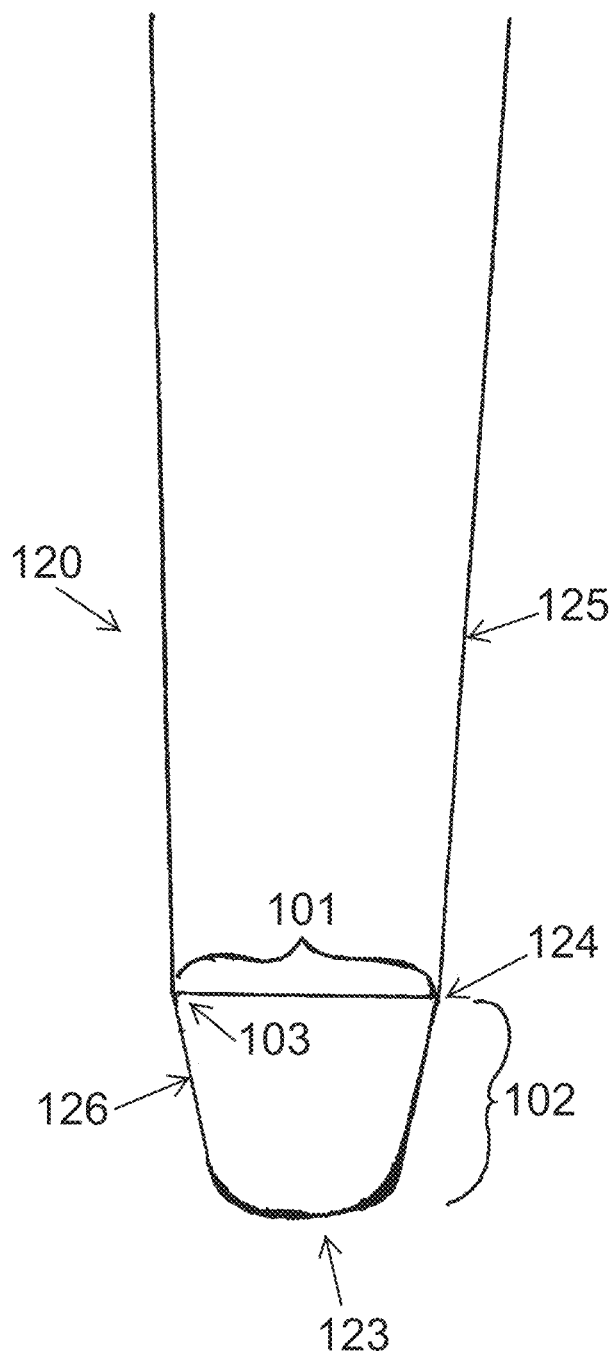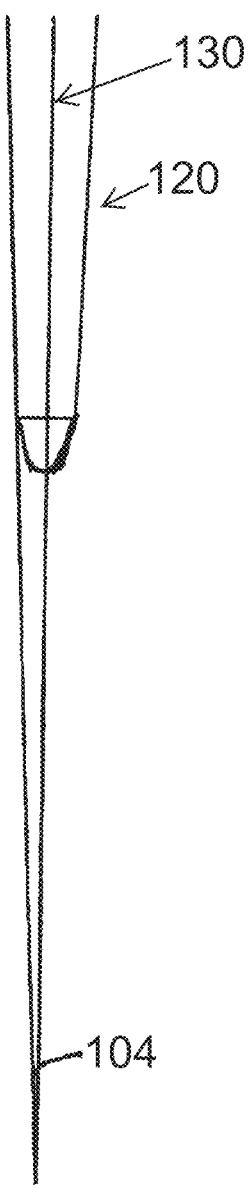

SUBGINGIVAL SAFE END DENTAL BUR

FIELD OF THE INVENTION

The field of the invention is burs used in dentistry. A dental bur fits into a hand drill to cut the tooth and or restorative material.

BACKGROUND

Teeth are restored and built up with a hard composite resin material which is similar in hardness to tooth material and is also the same color as teeth.

This creates a problem in dentistry where one cannot cut away the composite resin material with a sharp cutting bur and know for sure whether or not the tooth is also being cut. This is due to the inability to see or feel the difference between the composite resin and the tooth material. Currently, dentists go by shape of the tooth, to know where they should cut the filling material.

However, in areas that are difficult to see, to prevent cutting into the tooth material, dental burs have been manufactured with safe end tips.

FIGS. 1AA, 1AB, and 1AC show a variety of current safe end burs. Safe end tips are presently in the shape of a round end cylinder 20 or a round bulbous tip 21 or a cylinder with a pointed tip 22.

In all these cases the safe end meets the tooth on the same plane as the cutting surface to prevent the cutting of the tooth material at the join between the cutting surface and the safe end. The join 24 between the safe end and the cutting surface is shown in FIGS. 1AA-1AC. FIG. 1B shows a safe end bur 20 with the prior art cylinder safe end cutting the margin of a filling 33 with enamel 34 where the margin of the filing 33 is on the same 180 degree plane as the enamel 34.

The filling 33 is generally found above the gum tissues and so the prior safe end functions well to create a flush margin with the filling material above the gum tissues. However, there are problems if the dentist wants to create a margin of the filling material below the gum tissues with the current safe end burs.

The use of the prior art safe end burs shown in FIGS. 1AA-1AC and 1B will result in a microscopic ledge of composite resin when the composite resin is being cut away below the gum tissue. FIG. 2A shows the prior art safe end 20 cutting the filling material 33 with enamel 34 but leaving a microscopic edge 35.

Such a small ledge 35 may not be noticed in many areas of the tooth as it is almost microscopic in size. However, the microscopic ledge 35 can harbor bacteria.

Therefore, to cut a composite resin margin below the gum tissue that is perfectly flush to the tooth surface with no ledge, a new type of safe end is needed that will not leave a ledge.

BRIEF DESCRIPTION OF THE DRAWINGS

FIG. 3A is an enlarged view of a subgingival safe end dental bur according to the invention.

FIG. 3B is a view of a subgingival safe end dental bur showing an angle of the flat cutting surface according to the invention.

DETAILED DESCRIPTION

Figure 1A:
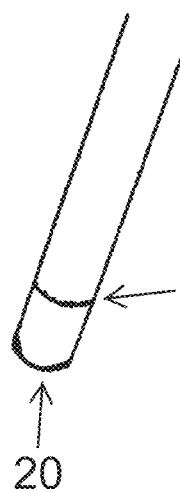
FIGS. 1AA, 1AB, and 1AC are views of prior art safe end burs.
Figure 1A:
Figure 1A:
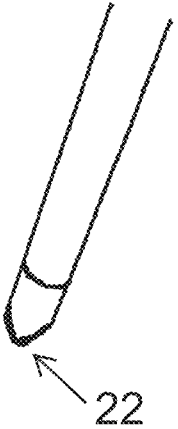
Figure 1B:
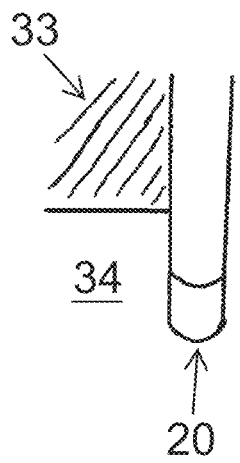
FIG. 1B is a view of a prior art safe end bur with the cylinder safe end cutting the margin of a filling with enamel.
Figure 1C:
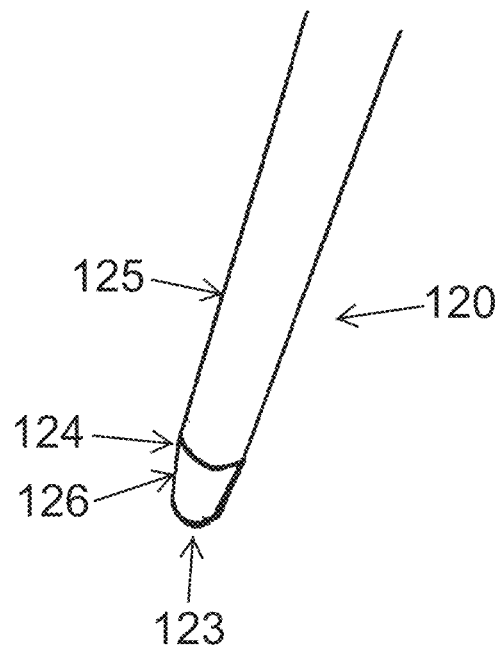
FIG. 1C is a view of a safe end tip according to the invention.

FIG. 1C illustrates a new type of safe end 123 that has an angle on the safe end 123 where the center of the angle is placed at the join 124 between a flat surface 126 on the safe end 123 and the flat cutting surface 125 of the bur 120. The flat cutting surface 125 of the new bur 120 may be metal flutes or diamond grit.

Figure 2A:
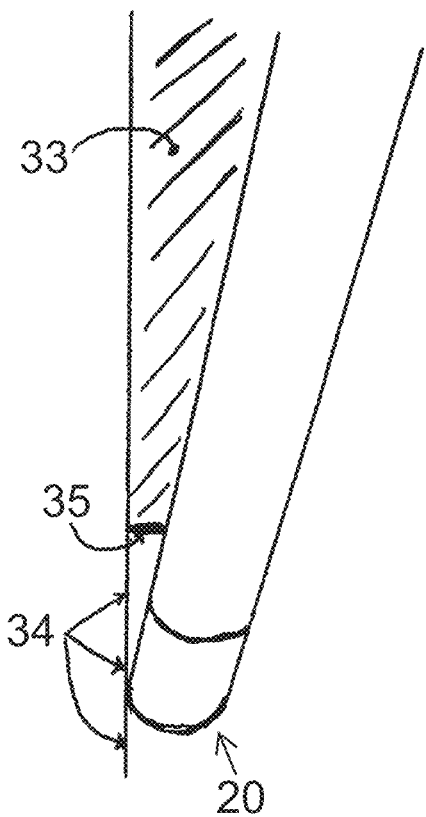
FIG. 2A is a view of a prior art safe end cutting the filling material with enamel but leaving a microscopic edge.
Figure 2B:
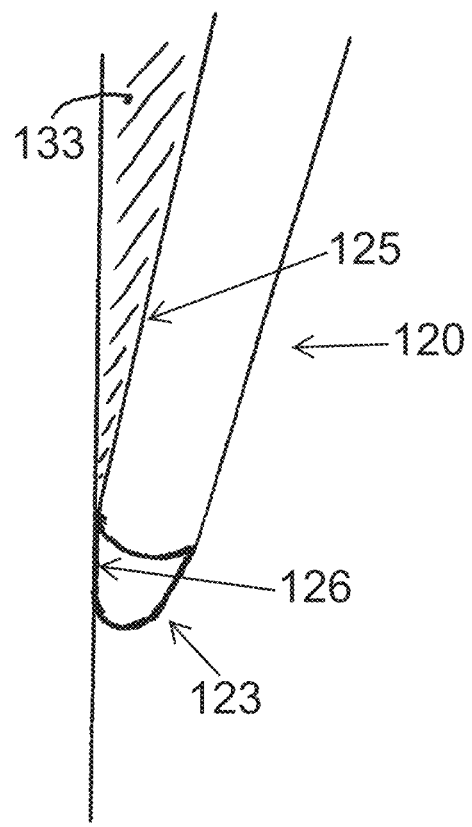
FIG. 2B is a view of a safe end tip cutting the filling material leaving no edge according to the invention.

FIG. 2B shows how the new safe end 123 with an angle between the flat surface 126 of the safe end 123 and the flat cutting surface 125 can be used to trim the filling material 133 leaving no ledge.

The new safe end bur 120 also needs to be able to cut the filling material 133 below the gum tissues in a limited area of space. If the subgingival bur 120 is too small, it cannot cut efficiently and if it is too large, it cannot fit under the gum tissues without cutting the gum tissues.

The safe end 123 also has to provide tactile sense to the dentist. To create such tactile sense the safe end 123 cannot be too small or the dentist will have less ability to feel the soft root with the safe end, and yet at the same time the safe end 123 cannot be too big or it will not fit under the gum tissues.

To provide tactile sense to the dentist the flat surface 126 of the safe end 123 should not be less than 0.2 mm in length but is preferably 0.3 to 0.4 mm in length.

Also, it is preferred that such a safe end bur 120 be able to be used to trim composite resin margins between the teeth. Therefore, ideally the bur 120 is thin. However, when prototypes were made that were thin, in order to fit between the teeth more easily, it was found that the thin bur would dig into the composite when cutting the filling material 133 creating a corduroy surface instead of smoothly shaving the filling material 133.

Thicker burs do not gouge the surface when pressure is applied but can be used in a firm shaving action to create a smooth composite resin surface. However, a thick bur cannot fit between the teeth.

From testing prototypes for use between the teeth, it has been learned by the inventor that preferably the bur 120 has to fit between the teeth and extend between the teeth into the embrasure spaces without cutting the adjacent teeth for a working or cutting distance of about 5 mm. Therefore, it is discovered that for the most effective and widest application or use of the new safe end bur 120 that even 5 mm from the tip of the bur 120, the bur 120 still has to be narrow enough to fit between the embrasure spaces of the teeth.

If the new bur 120 is too thin it cannot cut efficiently and if it is too thick at 5 mm from the tip it cannot fit between the teeth. The angle of divergence of the sides of the bur 120 that will produce this small range of acceptability for the purpose of a sub-gingival bur 120 has been determined by the inventor. From testing and use in the mouth it has been found that the angle of divergence of the sides of the flat cutting surface 125 of the bur 120 with a preferred tip diameter of 0.5 mm is from 1.5 degrees to 3.5 degrees from the long axis of the bur 120 but preferably is 2.23 degrees. The functional range of this angle is so small that variance of over 0.75 degrees smaller or larger makes the bur 120 incapable of its desired use.

Creating a safe end 123 that is for use above the gum tissues is a simple matter. However, creating a safe end 123 to be used below the gum tissues and between teeth is difficult and requires numerous prototypes to be fabricated and used in trials to establish the best dimensions of the safe end 123 itself and the dimensions of the flat cutting surface 125 of the bur 120 to give the best performance possible.

After making numerous different safe end burs 120 and using them in the mouth on patients the inventor believes that the safe end bur 120 that functions best to overcome all the above requirements is as follows:

(1) The width of the tip of the safe end 123 is preferably 0.55 mm but could be from 0.35 mm to 0.7 mm.

(2) The length of the tip of the safe end 123 is preferably 0.5 mm but could be from 0.35 mm to 0.7 mm.

(3) The angle at the join 124 of the flat surface 126 of the safe end 123 and the flat cutting surface 125 is preferably 170 degrees but could be from 155 degrees to 177 degrees.

(4) The flat surface 126 of the safe end 123 is preferably 0.3 to 0.4 mm in length but should not be less than 0.2 mm.

(5) The angle of the flat cutting surface 125 to the long axis of the bur 120 is preferably 2.23 degrees but can be 1.5 degrees to 3.5 degrees.

FIG. 3A shows the new bur 120 with a safe end 123 with a flat cutting surface 125 and a flat surface 126 on the safe end 123 with the join 124 between the flat cutting surface 125 and the flat surface 126 of the safe end 123 with the angle 103 between the flat cutting surface 125 and the flat surface 126. The total width 101 of the safe end 123 and the total length 102 of the safe end 123 are also shown in FIG. 3A. The divergence of the flat cutting surface 125 from the central axis 130 of the bur 120 is shown as angle 104 in FIG. 3B.

What is claimed is:

1. A dental bur configured to be used in restorative dentistry for cutting and trimming a filling material under gum tissues and between teeth, the dental bur comprising:
    a flat cutting surface configured to cut and trim the filling material under the gum tissues and between the teeth; and
    a safe end non-cutting tip with a flat surface on the safe end,
    wherein the flat surface on the safe end is between 0.3 and 0.4 mm in length,
    wherein the flat cutting surface and the flat surface on the safe end meet such that the flat cutting surface is inclined towards a central axis of the bur at an angle between 157 to 177 degrees relative to the flat surface on the safe end,
    wherein the safe end non-cutting tip has a width from 0.35 mm to 0.7 mm and a length from 0.35 mm to 0.7 mm.

2. The dental bur according to claim 1, wherein the flat cutting surface diverges in a straight plane from the central axis of the bur from between 1.5 to 3.5 degrees.

* * * * *